US008947231B2

(12) United States Patent
CS et al.

(10) Patent No.: US 8,947,231 B2
(45) Date of Patent: Feb. 3, 2015

(54) SYSTEM AND METHOD FOR MONITORING RESTRICTED AREAS BELOW BUCKET TRUCKS, LINEWORKERS ON POWER DISTRIBUTION POLES OR OTHER ELEVATED LOADS (75) Inventors: Adishesha CS, Karnataka (IN); Antonio Vitucci, Wauconda, IL (US); Michael D. Berg, Carol Stream, IL (US)

(73) Assignee: Honeywell International Inc., Morristown, NJ (US)

( * ) Notice: Subject to any disclaimer, the term of this patent is extended or adjusted under 35 U.S.C. 154(b) by 221 days.

(21) Appl. No.: 13/308,999

(22) Filed: Dec. 1, 2011

(65) Prior Publication Data

US 2013/0141238 A1 Jun. 6, 2013

(51) Int. Cl.
G08B 13/00 (2006.01)
(52) U.S. Cl.
USPC ............................................ 340/541
(58) Field of Classification Search
CPC ...... F16P 3/142; F16P 3/147; G08B 21/0261; G08B 21/0275; B66F 11/04; B66F 11/044; B66F 17/006
USPC .................... 340/541, 942, 908.1; 280/47.18, 280/47.131, 47.19
See application file for complete search history.

(56) References Cited

U.S. PATENT DOCUMENTS

| | | | |
|---|---|---|---|
| 5,552,772 A | 9/1996 | Janky et al. | |
| 6,278,924 B1 | 8/2001 | Gioutsos et al. | |
| 7,069,160 B2 | 6/2006 | Cecil | |
| 7,242,303 B2 | 7/2007 | Patel et al. | |
| 7,880,608 B2 | 2/2011 | Richards et al. | |
| 7,990,550 B2 | 8/2011 | Aebischer et al. | |
| 2004/0051659 A1* | 3/2004 | Garrison | 342/70 |
| 2006/0175127 A1* | 8/2006 | Higgins | 182/2.1 |
| 2008/0278308 A1* | 11/2008 | Kates | 340/522 |
| 2010/0231714 A1 | 9/2010 | Flores et al. | |

(Continued)

FOREIGN PATENT DOCUMENTS

| | | |
|---|---|---|
| GB | 2474094 A | 4/2011 |
| JP | 2009-271628 A | 11/2009 |

(Continued)

OTHER PUBLICATIONS

"Developing Network Situational Awareness through Visualizations of Fused Intrusion Detection Systems Alerts", Avitia, S.V., Air Force Inst. of Tech., Wright-Patterson AFB, OH. Graduate School of Engineering and Management.); Report: AFIT/GCS/ENG/08-23, 99p, Jun. 2008.

(Continued)

*Primary Examiner* — Brian Zimmerman
*Assistant Examiner* — Bhavin M Patel
(74) *Attorney, Agent, or Firm* — Wood, Phillips, Katz, Clark & Mortimer (57) ABSTRACT

A method and system (10) are provided for monitoring a restricted area (12) below a temporarily elevated worker (14) working on an elevated power transmission line (16). The method and system (10) utilize a wireless sensor system (30) that is temporarily elevated to a location (32) adjacent the worker (14) and that is configured to detect the presence of personnel (34) who enter the restricted area (12). The system (30) is configured to automatically alert personnel (34) at the worksite (17) who enter the restricted area (12) in response to detection of the personnel (34) by the wireless sensor system (30).

15 Claims, 6 Drawing Sheets

(56) References Cited

U.S. PATENT DOCUMENTS

2010/0330952 A1    12/2010   Yeoman
2011/0103641 A1    5/2011   Finn et al.

FOREIGN PATENT DOCUMENTS

JP        2010-282316 A    12/2010
WO    WO 2004/068433 A1    8/2004

OTHER PUBLICATIONS

"Task-Oriented Situation Recognition", Alexander Bauer et al, Proceedings of SPIE—The International Society for Optical Engineering, v 7709, 2010, Cyber Security, Situation Management, and Impact Assessment II; and Visual Analytics for Homeland Defense and Security II; ISSN: 0277786X; ISBN-13: 9780819481733; DOI: 10.1117/12.849646; Article No. 770906; Conference: Cyber Security, Situation Management, and Impact Assessment II; and Visual Analytics for Homeland Defense and Security II, Apr. 5, 2010-Apr. 9, 2010; Sponsor: The Society of Photo-Optical Instrumentation Engineers (SPIE); Publisher: SPIE.

"Implementation of Smart Tags of RFID Technology in Poisonous Area", Davood Moghaddam et al, International Conference on Computers—Proceedings, v 1, p. 320-324, 2010, Latest Trends on Computers—14th WSEAS International Conference on Computers, Part of the 14th WSEAS CSCC Multiconference; ISBN-13: 9789604742011; Conference: 14th WSEAS International Conference on Computers, Part of the 14th WSEAS CSCC Multiconference, Jul. 23, 2010-Jul. 25, 2010; Publisher: World Scientific and Engineering Academy and Society.

"Synthesis of passive RFID from backscatter using soft-computing techniques", Goutam Chakraborty et al, Proceedings—2nd International Conference on Emerging Applications of Information Technology, EAIT 2011, p. 325-328, 2011, Proceedings—2nd International Conference on Emerging Applications of Information Technology, EAIT 2011; ISBN-13: 9780769543291; DOI: 10.1109/EAIT.2011.88; Article No. 5734977; Conference: 2nd International Conference on Emerging Applications of Information Technology, EAIT 2011, Feb. 19, 2011-Feb. 20, 2011; Sponsor: Coal India Limited (A Navratna Company); Publisher: IEEE Computer Society (Abstract Only).

"RFID-based location-sensing system for safety management", Kwangsoo Kim et al, Personal and Ubiquitous Computing, p. 1-9, 2011; ISSN: 16174909, E-ISSN: 16174917; DOI: 10.1007/s00779-011-0394-0.

"A Robust Location Tracking Using Ubiquitous RFID Wireless Network", Keunho Yun et al, Ubiquitous Intelligence and Computing. Third International Conference, UIC 2006. Proceedings (Lecture Notes in Computer Science vol. 4159), 113-24, 2006; ISBN-10: 3 540 38091 4; Conference: Ubiquitous Intelligence and Computing. Third International Conference, UIC 2006. Proceedings, Sep. 3-6, 2006, Wuhan, China; Publisher: Springer-Verlag, Berlin, Germany.

"RFID-based Tag-Along Displays for Incident Command System Workflow Management", Lauren C. Landrigan et al, Conference Proceedings—IEEE International Conference on Systems, Man and Cybernetics, v 4, p. 2753-2757, 2007, 2006 IEEE International Conference on Systems, Man and Cybernetics; ISSN: 1062922X; ISBN-10: 1424401003, ISBN-13: 9781424401000; DOI: 10.1109/ICSMC.2006.385290; Article No. 4274297; Conference: 2006 IEEE International Conference on Systems, Man and Cybernetics, Oct. 8, 2006-Oct. 11, 2006; Sponsor: IEEE Systems, Man, and Cybernetics Society; Ministry of Education, Taiwan, R.O.C.; National Science Council, Taiwan, R.O.C.; Publisher: Institute of Electrical and Electronics Engineers Inc.

\* cited by examiner

SYSTEM AND METHOD FOR MONITORING RESTRICTED AREAS BELOW BUCKET TRUCKS, LINEWORKERS ON POWER DISTRIBUTION POLES OR OTHER ELEVATED LOADS

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD

In general, this application relates to the monitoring of restricted areas below temporarily elevated workers, such as, for example, construction workers on high rise buildings, tree trimming crews, installation and commissioning crews, and window washers. In one particular example, this application relates to wired distribution systems that utilize runs of transmission wires that are mounted overhead by poles and towers, such as electric power distribution systems that utilize distribution poles and towers to mount electric power transmission lines elevated at a safe distance above ground level, and to the work zones around such elevated wired distribution systems when one or more lineworkers are working on the elevated wired distribution system.

BACKGROUND

Elevated lines are widely used for the transmission of electrical power and communications. Such lines must be installed and regularly maintained and repaired. When a lineworker performs such tasks while inside an elevated bucket, the area below the bucket is considered hazardous. Crews of lineworkers working at ground level can be exposed to objects that can fall accidentally, including energized lines, tools or other material. The same hazardous conditions exist when a lineworker climbs a distribution pole or tower to perform a task. The area underneath an elevated lift bucket or a lineworker working on a pole is a restricted area that is often referred to as "line-of-fire" and is considered hazardous since there is a potential for falling objects such as tools or other materials.

To protect lineworkers against these hazards, utilities use standards and methods for establishing line-of-fire boundaries aimed at keeping lineworkers out of the restricted areas. For example cones are often used to cordon off an area considered hazardous. While these methods can be effective they are not capable of constantly monitoring and alerting lineworkers when someone crosses the boundary inadvertently. Accordingly, there is always room for improvement.

SUMMARY

In accordance with one aspect of the application, a method is provided for monitoring restricted areas below a temporarily elevated worker. The method includes the steps of elevating a wireless sensor system to an elevated location adjacent a worker that is temporarily positioned above ground level, enabling the wireless sensor system to detect the presence of other personnel who enter a ground level restricted area below the wireless sensor system and the worker, automatically alerting personnel who enter the restricted area in response to detection of the personnel by the wireless sensor, lowering the wireless sensor system from the elevated location in response to the worker returning to ground level, and disabling the wireless sensor system.

In one feature, the enabling step includes enabling a wireless transmitter to transmit a radio frequency signal.

In a further feature, the enabling a wireless transmitter step includes enabling an array of wireless transmitters to transmit a radio frequency signal.

As one feature, the enabling step includes enabling a wireless receiver to receive a radio frequency signal responsive to the radio frequency signal transmitted from the wireless transmitter.

According to one feature, the enabling step includes enabling a programmable processor to recognize a radio frequency signal generated from a Radio Frequency Identification chip worn by a person entering the restricted area.

As one feature, the enabling step includes enabling a programmable processor to determine a Doppler effect in response to the radio frequency signal being reflected off of a person in the restricted area.

In a further feature, the method further includes the step of enabling a receiver worn by a person in the restricted area to respond to the radio frequency signal transmitted from the wireless transmitter.

According to one feature, the enabling, step includes enabling an array of laser diodes to emit optical energy and further enabling a programmable processor to determine the presence of a person in the restricted area in response to the optical energy being reflected off of the person.

In one feature, the enabling step includes enabling a programmable processor to detect the presence of a person in the danger in response to an anomalous pattern in a time dependent series of optical images of the restricted area.

As one feature, the enabling step includes automatically adjusting a size of the restricted area in response to changes in height of the elevated location. According to a further feature, the method further includes moving the wireless sensor system with the worker in response to changes in the position of the worker. In yet a further feature, the method further includes the step of attaching the wireless sensor system to a lift platform that alters the position of the worker above ground level.

According to one feature, the method further includes the step of temporarily attaching the wireless sensor system to a pole structure that is ascended by the worker.

In one feature, the method further includes the step of attaching the wireless sensor system to a lift platform that alters the position of the worker above ground level.

In accordance with one feature of the application, a system is provided for monitoring restricted areas below a temporarily elevated worker. The system includes a wireless sensor configured to detect the presence of personnel who enter a ground level, restricted area below the wireless sensor system when the wireless sensor is elevated to an elevated location adjacent a temporarily elevated worker, and a programmable processor configured to automatically adjust a size of the restricted area in response to changes in height of the elevated location.

Other features and advantages will become apparent from a review of the entire specification, including the appended claims and drawings.

DETAILED DESCRIPTION

Figure 1:
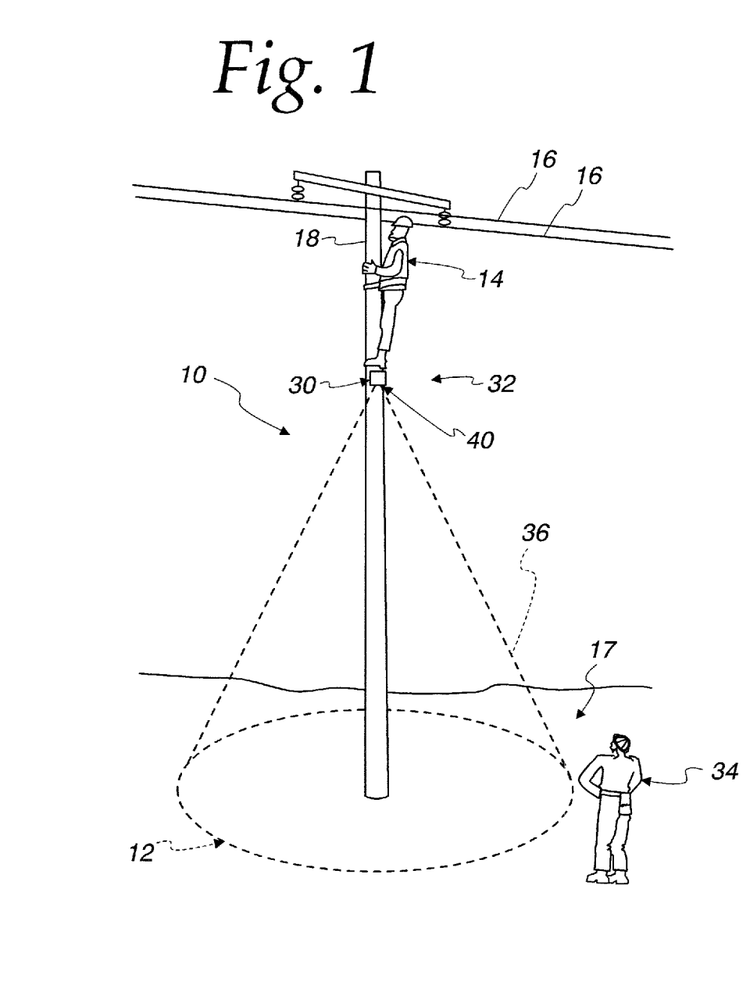
FIG. 1 is a somewhat diagrammatic representation of a worksite at an elevated power transmission line employing a method and system for monitoring a restricted area below a temporary elevated worker on a power pole at the worksite.
Figure 2:
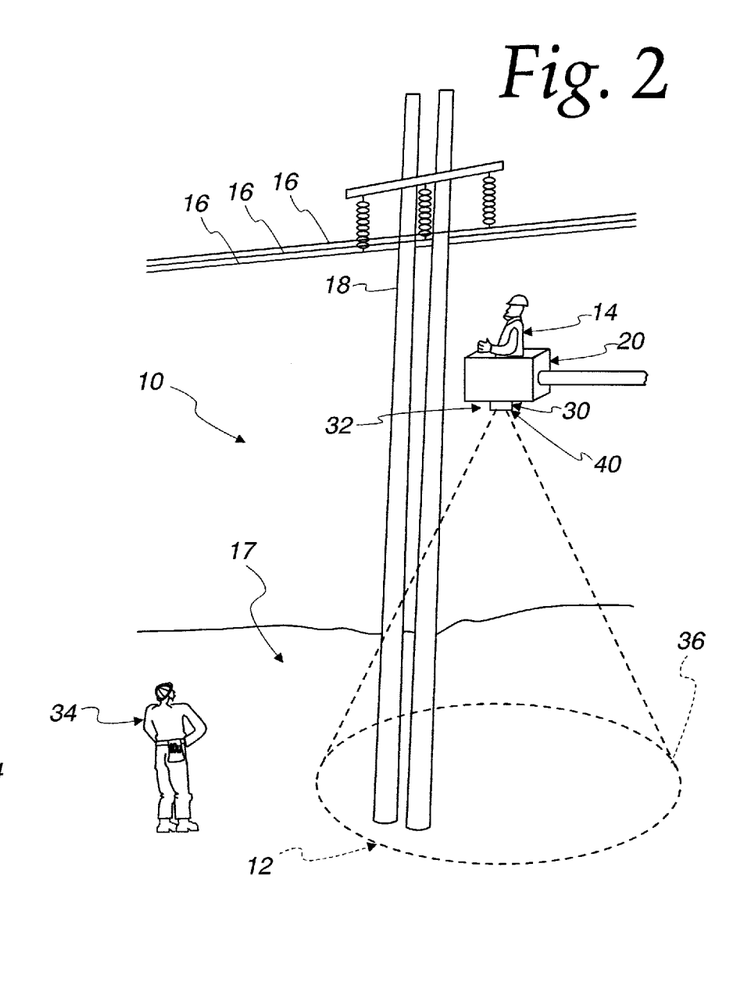
FIG. 2 is a figure similar to FIG. 1, but showing the lineworker elevated in a lift bucket.

With reference to FIGS. 1 and 2, a method and system are shown diagrammatically at 10 for monitoring a restricted area 12 below a temporarily elevated worker 14, such as a lineworker 14, working on an elevated power transmission line 16 at a worksite 17 after having ascended a distribution pole or tower 18 (FIG. 1) or having been elevated by a lifting device, such as a lift bucket 20 (FIG. 2). The method and system 10 utilize a wireless sensor system 30 that is temporarily elevated to a location 32 adjacent the worker 14 and that is configured to detect the presence of personnel, such as other lineworkers 34, who enter restricted area 12 below the wireless sensor system 30 when the wireless sensor system 30 is elevated to the location 32 adjacent the elevated worker 14. The restricted area 12 will typically be of a predetermined size at ground level below the elevated worker 14. In the is regard, the system 30 is configured to generate a radiation pattern 36 and to automatically alert personnel 34 at the worksite 17 who enter the restricted area 12 in response to detection of the personnel 34 by the wireless sensor system 30. The wireless sensor system 30 is either portable so it can be temporarily located on a power pole or transmission tower 18 that has been ascended by a worker 14, such as shown in FIG. 1, or is fixed to a lift platform 20 that supports the elevated worker 14, such as the lift bucket 20, so that the wireless sensor system 30 moves with the worker 14 in response to changes in the position of the worker 14 and lift bucket 20, such as shown in FIG. 2.

Figure 3:
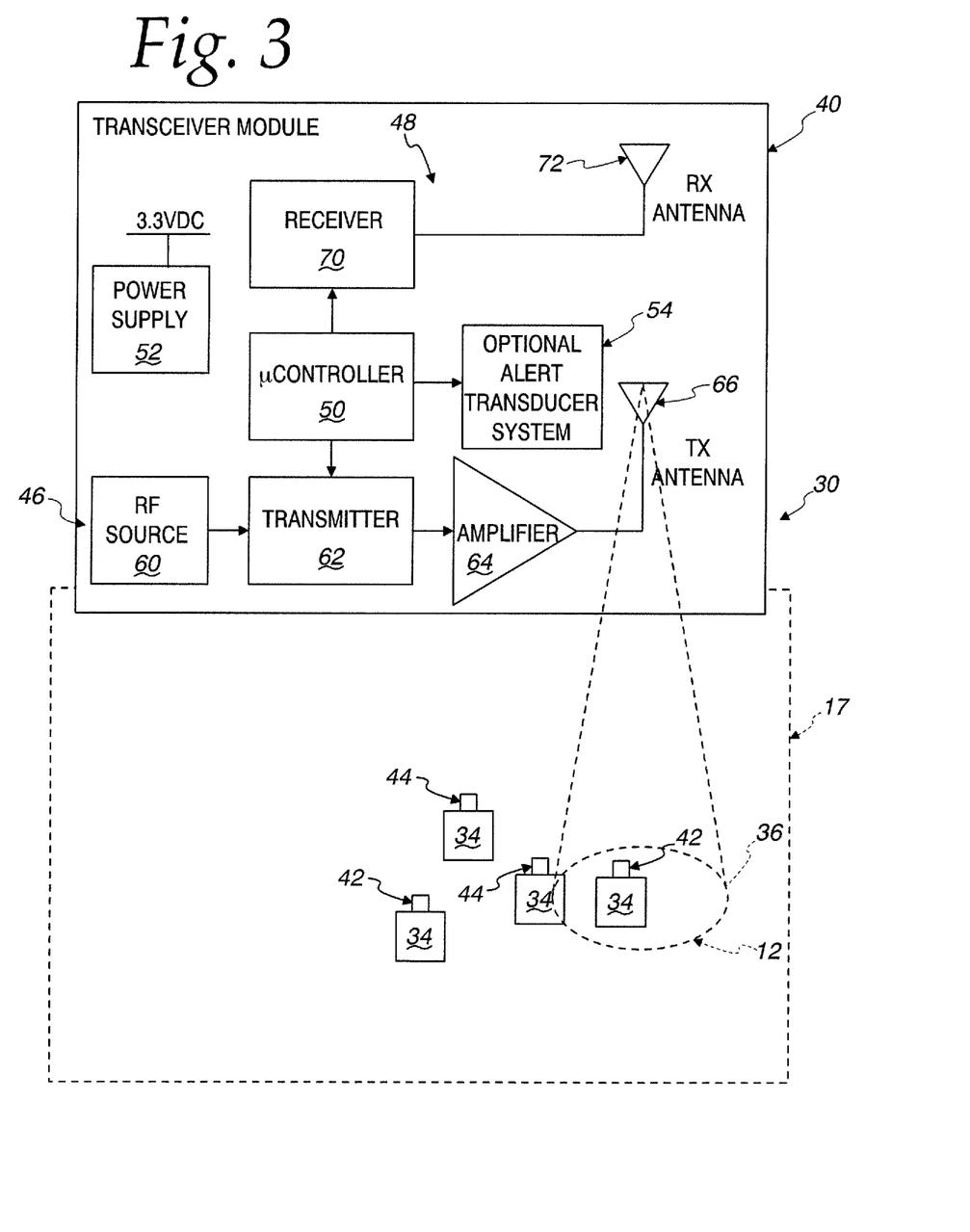
FIG. 3 is a diagrammatic representation of the system and method of FIGS. 1 and 2.

While there are several possible technologies that can be utilized for the wireless sensor system 30, in one embodiment shown diagrammatically in FIG. 3, the wireless sensor system 30 utilizes a wireless radio frequency (RE) transceiver module 40 that can be used with either active receiver modules 42 worn by the personnel 34 at the worksite 17 or by passive radio frequency identification (RFID) chips/tags 44 that are worn by the personnel 34 at the worksite 17.

The RF transceiver module 40 includes a transmitter section 46, a receiver section 48, a programmable processor in the form of a microcontroller 50 coupled to the transmitter and receiver sections 46 and 48, and a power supply 52 for supplying power to the components 46, 48 and 50. The transceiver module 40 can also include an alert transducer system 54 that would also be powered by the power supply 52. The transmitter section 46 includes an RF source 60, a transmitter 62, an amplifier 64 and a transmit antenna 66. The receiver section 48 includes a receiver 70 and an antenna 72.

Figure 4:
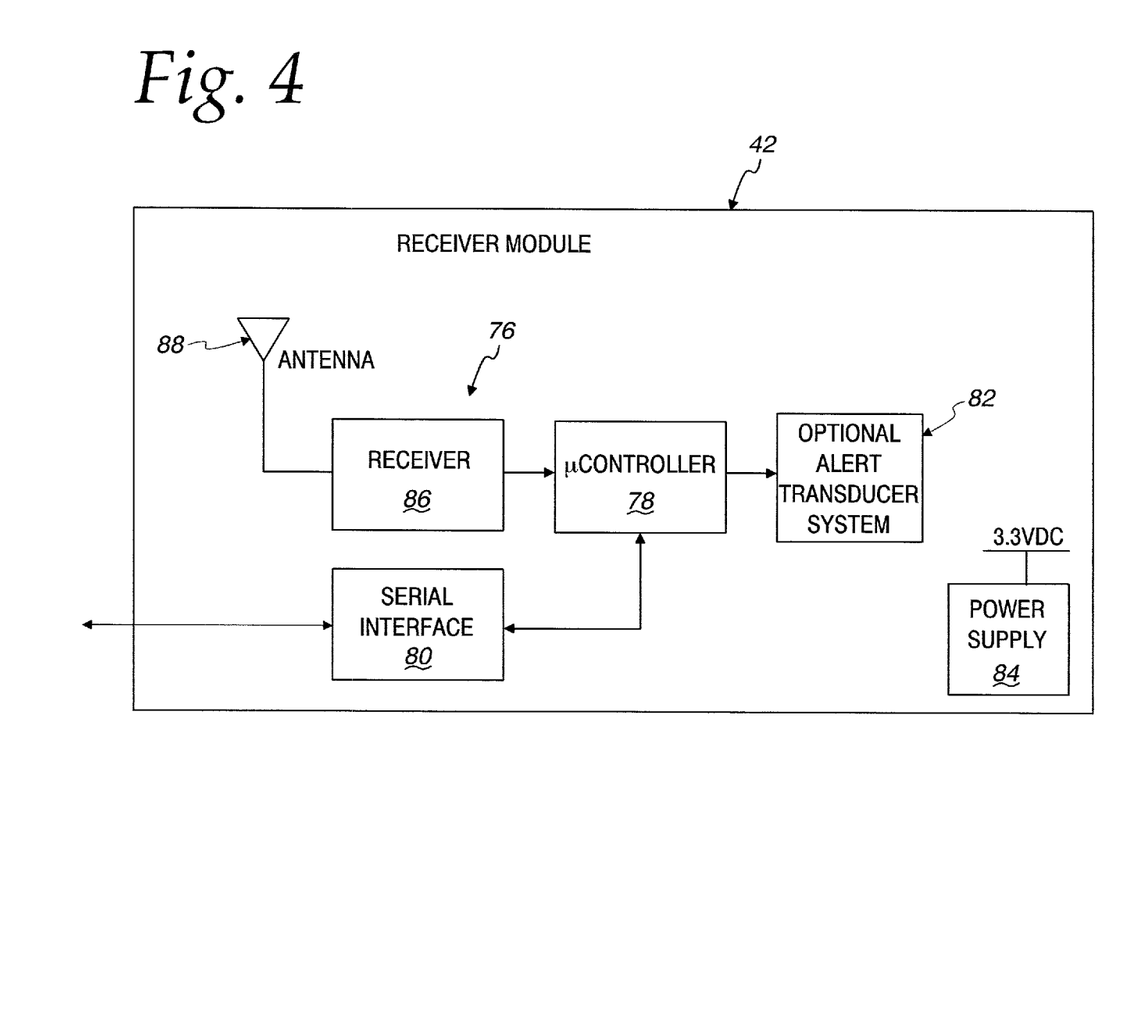
FIG. 4 is a diagrammatic representation of an active receiver module for use in the system and method of FIGS. 1-3.

As best seen in FIG. 4, in one embodiment, the active receiver module 42 includes a receiver section 76, a programmable processor in the form of a microcontroller 78, a serial interface 80, an optional alert transducer system 82 and a power supply 84 connected to provide power to the components 76, 78, 80 and 82 of the receiver module 42. The receiver section 76 includes a receiver 86 and a receiving antenna 88. The power supply 84 will typically be in the form of a battery, and in some embodiments a rechargeable battery.

While any suitable components and bandwidths/frequencies may be used, the RF transceiver and active receiver modules 40 and 42 can consist of commercially available off-the shelf RF devices that operate in license free bands such as 5.8 GHz, 2.4 GHz or 900 MHz. Similarly, as a further example for some embodiments, the technology chosen should operate at low energy levels, be short range and be ideal for directional applications. UWB (ultra-wide band) technology may be a suitable candidate. Although intended for high bandwidth operation, which is not a requirement here, UWB can be used license free and is used in short range applications such as personal area networks.

Figure 5:
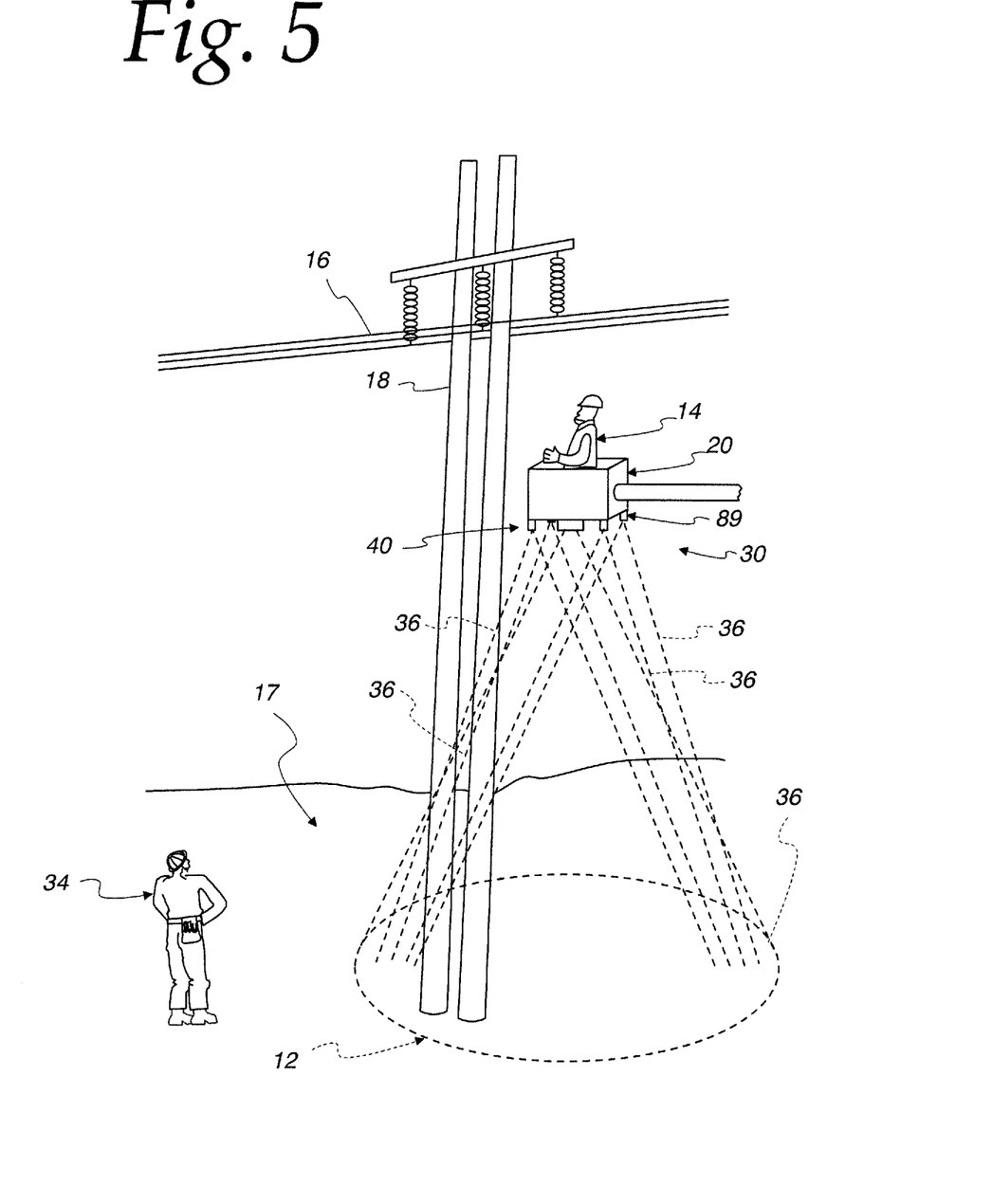
FIG. 5 is a somewhat diagrammatic representation showing an alternate embodiment of the system and method of FIGS. 1-4.

While it is possible to utilize a single transmitter section 46, because the radiation pattern is heavily dependent on the antenna design, it may be more difficult in some cases to obtain the desired control for monitoring the desired size of the restricted area 12. One alternative is to use an antenna or transmitter array 89 as shown in FIG. 5 to generate a plurality of radiation patterns 36. If this alternative is chosen, the transceiver module 40 adds additional blocks of the transmitter 62, amplifier 64 and transmit antenna 66 to form the array 89, while utilizing the same RF source 60, microcontroller 50, receiver section 46, and power supply 52. In this configuration, the RF energy is more concentrated towards the center of the restricted area 12. Each transmitter 62 in the array 89 also can be mounted so that the mounting angle and resulting radiation pattern 36 are self-adjustable towards the center of the restricted area 12.

Furthermore, by simultaneously adjusting the detection thresholds of the active receiver modules 42 via the microcontroller 78, the detection area can be biased towards the center of the restricted area 12 so that the restricted area 12 is more tightly controlled. The detection threshold can also be self-adjusted as a function of the height of the transceiver 40 so that the desired size of the restricted area 12 is adjusted as the transceiver module 40 is raised or lowered with the bucket 20 or on a pole 18. In the case of the bucket 20, the restricted area 12 would follow the movement of the bucket 20 since the transceiver module 40, including the transmitter array 89, is permanently mounted underneath the bucket 20. One advantage of using the active receiver module 42 is that it may be easier to maintain a well-defined restricted area 12.

When the active receiver modules 42 are employed, an active receiver module 42 is attached to the hard hat or other Personal Protection Equipment (PPE) of each lineworker 34 at the worksite 17. When a lineworker 34 inadvertently enters the restricted area 12, the receiver module 42 detects the RF signal from the transceiver module 40 and either (or both) of the alert transducer systems 54 and 82 generate an alert/alarm indicating the restricted area 12 has been violated. In this regard, the alert can be audio, visual, tactile, or any combination thereof. To prevent an alarm for the lineworker 14 on a pole 18 or inside a bucket 20, the receiver module 42 for that worker could be configured via the microcontroller 78 to prevent detection of the RF signal from the transceiver module 40. Similarly, lineworkers 34 who must enter the restricted area 12 on a restricted basis can have their receiver modules 42 configured via the microcontroller 78 for timed entry so that when the lineworker 34 enters the restricted area 12, an initial warning alert is issued and if the maximum time period allowed inside the restricted area 12 is exceeded, a full warning alert is then issued.

When passive RFID tags 44 are utilized, a passive RFID tag 44 is attached to the hard hat or other PPE of each lineworker 34 at the worksite 17. When a lineworker 34 inadvertently enters the restricted area 12, the transceiver module 40 installed on the bucket 20 or pole 18 reads the RFID tag 44 and generates an alert. For the lineworker 14 on the pole 18 or inside the bucket 20, a FOB could be used to supersede the RFID tag 40 for that lineworker 14. Similarly, a FOB could be issued for a lineworker 34 who requires restricted entry. The RFID tags 44 require no batteries and they are a relatively low cost item as a PPE-mounted device. While in some cases it may be more difficult to maintain a well-defined restricted area 12 which could result in more frequent alerts, this concern could be mitigated by using a secondary low power sensor such as a motion detector to resolve ambiguities of signal strength changes.

As another alternative, Doppler radar technology can be used with a single transceiver module 40 installed on a bucket 20 or a pole 18, and configured as a radar transceiver module 40. This alternative does not require that an active receiver module 42 or passive RFID tag 44 be installed in the PPE of the lineworkers 34. The transmitter section 46 continuously transmits an RF signal. If a lineworker 34 enters the restricted area 12, the microcontroller 50 of the module 40 is programmed to use the Doppler effect (the change in frequency that is observed by the receiver section 48 when the transmitted RF signal is reflected from a lineworker 34 crossing the boundary) to detect a lineworker 34 in the restricted area 12. One advantage of this approach is that it is self-contained.

Figure 6:
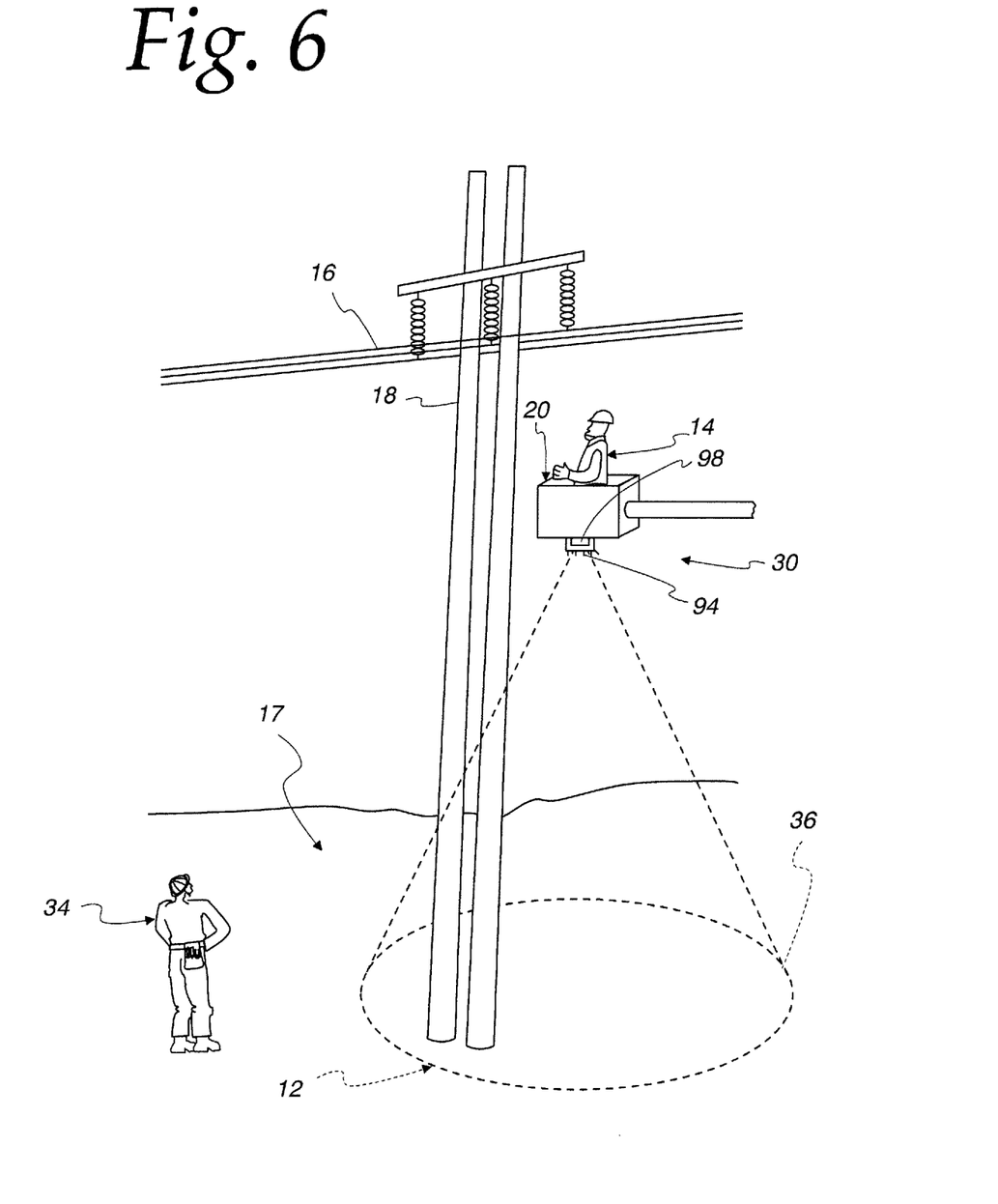
FIGS. 6 and 7 are somewhat diagrammatic representations showing alternate embodiments of the system and method.

As shown diagrammatically in FIG. 6, another alternative is to use a ring of laser diodes 94 mounted to the bucket 20 or pole 18. The detection method is similar to the radar technology discussed above except that the reflected optical energy is used to detect a lineworker 34 entering the restricted area 12. Specifically, an optical receiver collects reflected optical energy and a programmable processor in the form of a microcontroller 98 analyzes the reflected optical energy to determine the presence of a lineworker 34 in the restricted area 12. One advantage of this approach is that the transmitted optical energy is more coherent or collinear than the RF energy, which simplifies the task of controlling the restricted area 12.

Figure 7:
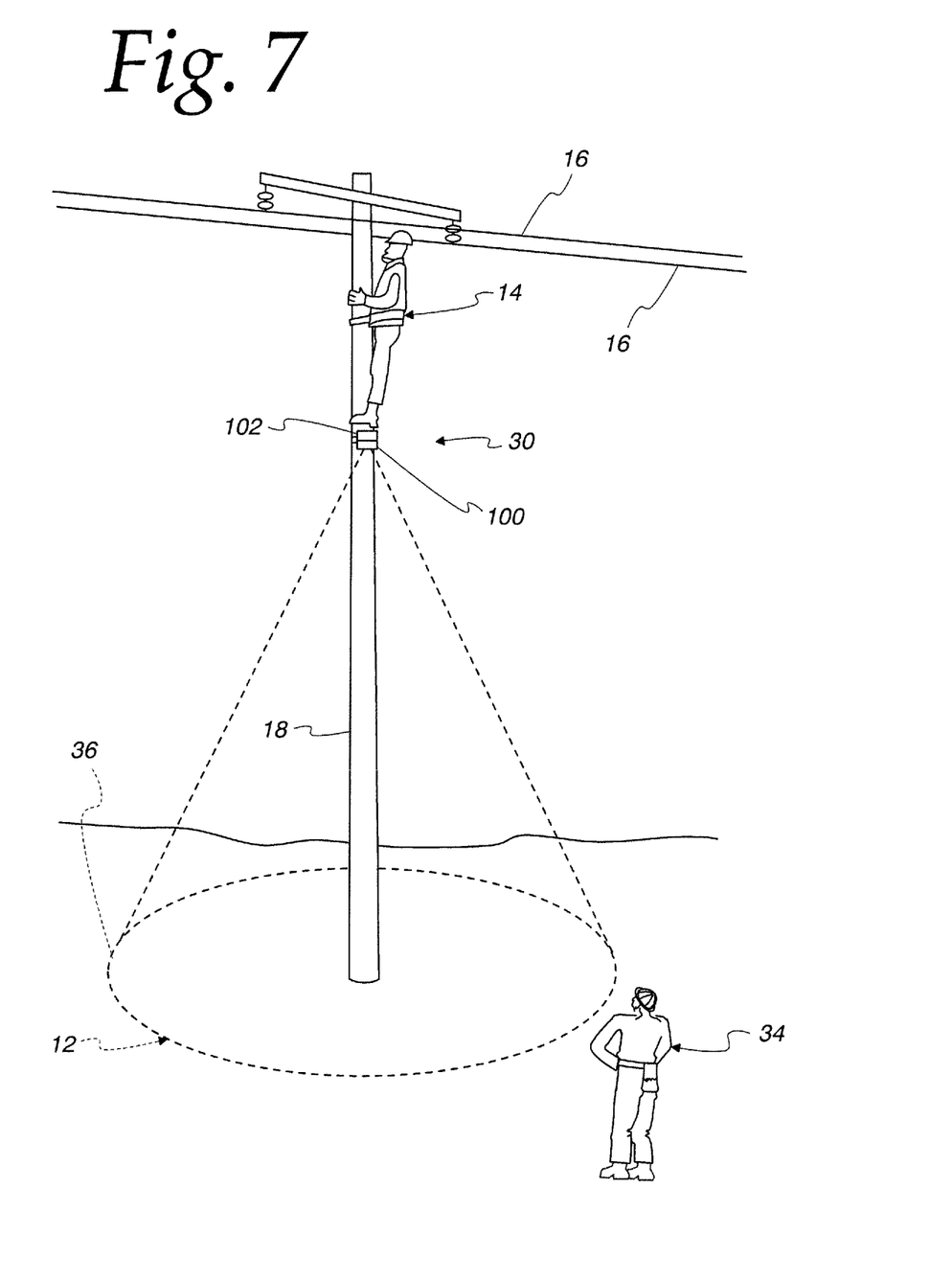

As shown diagrammatically in FIG. 7, an alternative to the RF and optical technologies is the use of pattern recognition via one or more video or still photo cameras 100. This technology requires either continuous video streams or periodically captured photo images. The video or photo images are then processed in a programmable processor in the form of a microcontroller 102 through algorithms to recognize anomalous patterns such as inadvertent intrusions into the restricted area 12. The video or images could be used for pattern recognition only and would not need to be stored or recorded.

While certain specific embodiments have been shown and described herein, it should be appreciated that other embodiments and modifications are possible within the scope of the disclosure and that specific structures and steps should not be read into the claims unless expressly recited therein. It should further be appreciated that while the system and method 30 have been described herein in connection with elevated power transmission lines, the system and method may be employed in any situation wherein a worker or other person is temporarily elevated above a site that may be entered by other people or personnel. Accordingly, the system and method 30 are not limited to use in connection with elevated power transmission lines. It should further be understood that in some situations, the system and method 30 described herein may be employed when just a load, such as a pallet of commercial or construction items, is temporarily elevated above a site that may be entered by other people or personnel.

The invention claimed is:

1. A method for monitoring restricted areas below a temporarily elevated worker, the method comprising the steps of:
    elevating a wireless sensor system to an elevated location adjacent the worker that is temporarily positioned above ground level;
    enabling the wireless sensor system to detect the presence of other personnel who enter a ground level restricted area below the wireless sensor system and the worker;
    automatically alerting personnel who enter the restricted area in response to detection of the personnel by the wireless sensor;
    lowering the wireless sensor system from the elevated location in response to the worker returning to ground level; and
    disabling the wireless sensor system.

2. The method of claim 1 wherein the enabling step comprises enabling a wireless transmitter to transmit a radio frequency signal.

3. The method of claim 2 wherein the enabling the wireless transmitter step comprises enabling an array of wireless transmitters to transmit the radio frequency signal.

4. The method of claim 2 wherein the enabling step comprises enabling a wireless receiver to receive the radio frequency signal responsive to the radio frequency signal transmitted from the wireless transmitter.

5. The method of claim 4 wherein the enabling step comprises enabling a programmable processor to recognize a radio frequency signal generated from a Radio Frequency Identification chip worn by a person entering the restricted area.

6. The method of claim 4 wherein the enabling step comprises enabling a programmable processor to determine a Doppler effect in response to the radio frequency signal being reflected off of a person in the restricted area.

7. The method of claim 2 further comprising the step of enabling a receiver worn by a person in the restricted area to respond to the radio frequency signal transmitted from the wireless transmitter.

8. The method of claim 1 wherein the enabling step comprises enabling an array of laser diodes to emit optical energy and further enabling a programmable processor to determine the presence of a person in the restricted area in response to the optical energy being reflected off of the person.

9. The method of claim 1 wherein the enabling step comprises enabling a programmable processor to detect the presence of a person in the danger in response to an anomalous pattern in a time dependent series of optical images of the restricted area.

10. The method of claim 1 wherein the enabling step comprises automatically adjusting a size of the restricted area in response to changes in height of the elevated location.

11. The method of claim 10 further comprising moving the wireless sensor system with the worker in response to changes in the position of the worker.

12. The method of claim 11 further comprising the step of attaching the wireless sensor system to a lift platform that alters the position of the worker above ground level.

13. The method of claim 1 further comprising the step of temporarily attaching the wireless sensor system to a pole structure that is ascended by the worker.

14. The method of claim 1 further comprising the step of attaching the wireless sensor system to a lift platform that alters the position of the worker above ground level.

15. A system for monitoring restricted areas below a temporarily elevated worker, the system comprising:
- a wireless sensor configured to detect the presence of personnel who enter a ground level, restricted area below the wireless sensor system when the wireless sensor is elevated to an elevated location adjacent the temporarily elevated worker; and
- a programmable processor configured to automatically adjust the predetermined size of the restricted area in response to changes in height of the elevated location.

* * * * *